Dec. 12, 1967 G. L. KRAKE ET AL 3,358,162

THERMOELECTRIC GENERATORS UTILIZING POROUS ELECTRON EMITTING MATERIALS

Filed March 30, 1964

INVENTORS,
GUSS L. KRAKE
A. VAN DER ZIEL
BY Harry M. Saragovitz, Edward J. Kelly, Herbert Berl & Julian C. Keppler
ATTORNEYS United States Patent Office 3,358,162
Patented Dec. 12, 1967

3,358,162
THERMOELECTRIC GENERATORS UTILIZING POROUS ELECTRON EMITTING MATERIALS

Guss L. Krake and Aldert van der Ziel, Minneapolis, Minn., assignors to the United States of America as represented by the Secretary of the Army Filed Mar. 30, 1964, Ser. No. 355,984
8 Claims. (Cl. 310—4)

This invention relates to thermoelectric devices, and more particularly to thermoelectric generators made of porous electron emitters.

It is well known to use the thermoelectric effect in semiconductor materials for the direct conversion of heat into electric power, and it is also well known to use the thermionic emission from hot cathodes for the direct conversion of heat into electric power. The available DC power from a thermoelectric device made of a semiconductor material is $\frac{1}{4}E^2/R$ when the device has a resistance R and an open circuit EMF E. One encounters difficulty with this type of generator when an attempt is made to optimize the above given power expression. Naively, one might think that all that is required for optimum power output is a large thermo-EMF per degree, a large carrier density, and a large mobility of the carriers. However, due to the fact that these properties are not independent, the optimization procedure is somewhat more complicated.

The power expression for devices utilizing thermionic emission from a hot cathode is not as simple as the one given above because this type device has a strong nonlinear characteristic. However, it can generally be stated that best efficiencies are obtained when the anode-cathode distance is small and when the anode work function is lower than the cathode work function. These two requirements present some technological difficulties.

Prior to our invention, the solid state thermoelectric generators were made of relatively non-porous materials. We have found that a considerable thermoelectric EMF can be developed at elevated temperatures by depositing certain materials between two electrodes in such a manner that the deposited material forms a porous layer or layers between the electrodes.

Therefore, an object of our invention is to provide a thermoelectric generator.

Another object of our invention is to provide a thermoelectric generator utilizing a porous electron emitting material.

A still further object of our invention is to directly convert heat energy to electrical energy by applying heat to porous materials.

The above mentioned and other objects will become more readily apparent from the following description and accompanying drawing wherein.

Figure 1:
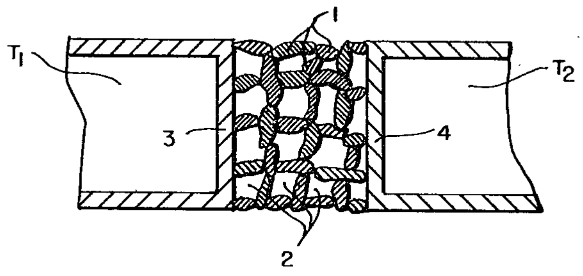
FIGURE 1 is a sketch of our basic generator.

In FIG. 1 a porous electron emitting material is shown between the two electrodes 3 and 4. The porous material or coating consists of the grains 1 and the pores 2. In order to obtain a thermoelectric EMF, electrodes 3 and 4 are maintained at temperatures $T_1$ and $T_2$, respectively. The open circuit polarity of the two electrodes is determined by the temperature relationship of the two electrodes. If $T_1$ is higher than $T_2$, electrode 4 will be negative with respect to electrode 3 when no current is flowing. In the device shown in FIG. 1 either $T_1$ or $T_2$ can be the higher of the two temperatures because the porous material can conduct in either direction.

The thermoelectric generator of FIG. 1 has two modes of operation. These modes of operation depend on the magnitude of the applied temperature. If the temperature of the hot electrode is less than 500° C., our generator operates as a true semiconductor thermoelectric generator. In this mode of operation the thermoelectric EMF is small due to the high resistance of the coating. The conduction takes place through the grains of the material. At temperatures much higher than 500° C. the pores are filled with an electron gas originating from the thermionic emission of grains 1. Conduction now takes place through this electron gas in the pores of the coating. The thermoelectric EMF is much larger, and the resistance of the porous coating is much lower, therefore reasonable efficiencies become possible.

At the higher temperatures our device operates as a thermionic device rather than a thermoelectric semiconductor. Each one of the pores becomes a tiny diode. One face of a pore is the cathode and the opposite face is the anode of the small diode. A porous coating such as shown in FIG. 1 contains many of these tiny diodes. Electrically speaking these diodes are connected in both series and parallel. Each diode produces a tiny EMF and the total EMF of the generator is composite of the separate small EMF's of the diodes.

From the above discussion it is obvious that the material used between electrodes 3 and 4 must readily emit electrons and must have a high degree of porosity for satisfactory performance. We have found that a porosity of greater than 50% provides satisfactory performance. There are numerous electron emissive materials available today, however we have found that barium-strontium oxide and thorium oxide are particularly suitable as electron emitters. Once the material has been selected the problem of depositing this material on the electrodes with a high degree of porosity remains. We have found that suitable porosities can be obtained by spraying the material on one of the electrodes. The remaining electrode is fastened to the coating by any suitable means. Any degree of thickness can be obtained by spraying the material in layers. After the generator has been fabricated the electron emissive coating must be activated. This is accomplished by passing a DC current through the material.

Figure 2:
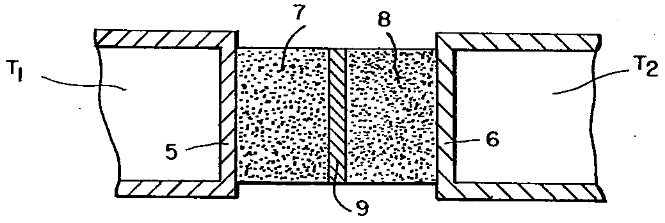
FIGURE 2 shows a variation of our basic generator.

The thermoelectric generator shown in FIG. 2 is an extension of our basic generator. In FIG. 2 two different electron emissive materials 7 and 8 are placed between the electrodes 5 and 6. Coatings 7 and 8 are separated by a thin metal layer 9 to prevent diffusion of one material into the other. The material having the highest work function is located at the "hot side" of the generator and the material with the lower work function is located at the "cold side." Thus, if $T_1$ of FIG. 2 is a higher temperature than $T_2$, porous coating 7 is fabricated from material having a higher work function than the material used for coating 8. The generator of FIG. 2 produces two thermal-EMF's. One between electrode 5 and layer 9 and the other between electrode 6 and layer 9. These two EMF's add, and, of course, the resistances of materials 7 and 8 also add; however, by the proper choice of materials the efficiency of the combination will be greater than the efficiency of each porous coating taken separately.

The generator of FIG. 2 is fabricated in a manner similar to the fabrication of the basic generator. The material used for porous coating 7 is sprayed on electrode 5 and metal layer 9 is then attached to this layer. The material used for coating 8 is sprayed on metal layer 9 and electrode 6 is then attached to coating 8. Of course, this procedure can be varied. For example, material 7 could be sprayed on electrode 5, material 8 on electrode 6, and the two porous materials are then coupled by attaching them to opposite faces of metal layer 9. Also, the generator of FIG. 2 can be extended by using three or more different emissive materials. Each different material is separated by a metal layer and the work functions of the various materials decreases progressively when going from the hot side to the cold side. As was the case in the porous material used in the generator of FIG. 1, the emissive material shown in FIG. 2 must also be activated. This again is accomplished by passing a DC current through the porous coatings. Each coating in the generator of FIG. 2 can be activated separately or, preferably, a DC current is passed through the entire structure.

If the problem of diffusion is ignored, a further modification of our generator can be obtained by simply removing metal layer 9 and attaching emissive layer 7 to emissive layer 8. A more elaborate structure is obtained by spraying materials of decreasing work function on the hot electrode in such a manner that the work function decreases when going from the hot electrode to the cold electrode. The different materials can be sprayed in layers on the hot electrode in such a manner that there is definite boundary between materials having different work functions or one layer can be made to go over into the next layer in a more gradual manner. This type of fabrication helps in increasing the short-circuit current of each pore and hence that of the entire device.

From the foregoing description it is apparent that our thermoelectric generators have several desirable features that are not found in the prior art generators. For example, in the prior art semiconductor generators conduction takes place in the bulk of the material, whereas conduction in our device is through the pores. Therefore, the electron emissive coatings used in our generators exhibit a lower resistance and greater efficiency than the emissive coatings of the prior art semiconductor thermoelectric generators. Another desirable feature of our generator is the inherent small anode-cathode distances. Each pore is a tiny diode with an anode-cathode distance of 10 microns or less. It was pointed out above that the efficiency of a thermionic device is increased by keeping the anode-cathode distance as small as possible. A small anode-cathode distance is an inherent feature of our generator. Also, we can use higher temperatures because cathode evaporation is less of a problem with our device than it is with the standard thermionic device.

Many other variations and modifications of our invention will be apparent to those skilled in the art, theretofore the specific examples shown and described are to be considered as exemplary only and not as limitations on the scope of our invention. We intend to be limited only by the scope of the appended claims.

What is claimed is:

1. A device for the direct conversion of heat to electricity comprising: a first electrode maintained at an elevated temperature; a layer of porous electron emitting material electrically connected to said first electrode, said porous emitting material having a porosity greater than 50%; and a second electrode electrically connected to said emitting material in such a manner that said material is sandwiched between said first and second electrode, said second electrode being maintained at a temperature lower than said elevated temperature.

2. A device as described in claim 1 wherein said electron emitting material consists of a barium-strontium oxide mixture.

3. A device as described in claim 1 wherein said electron emitting material consists of thorium oxide.

4. A device as described in claim 1 wherein said elevated temperature is sufficiently high to cause pore conduction to strongly predominate over grain conduction.

5. A device for the direct conversion of heat to electricity comprising: a first electrode maintained at an elevated temperature; a first porous electron emitting material having a porosity greater than 50% deposited on said first electrode, said first material having a given work function; a thin metal layer attached to said first material; a second porous electron emitting material having a porosity greater than 50% deposited on said metal layer, said second material having a work function lower than the work function of said first material; and a second electrode attached to said second material, said second electrode being maintained at a temperature lower than said elevated temperature of said first electrode.

6. A device for the direct conversion of heat to electricity comprising: a first electrode maintained at an elevated temperature; a second electrode maintained at a temperature lower than said elevated temperature; and a plurality of porous electron emitting materials, each having a different work function and each having a porosity greater than 50%, electrically coupled between said first and second electrodes, said plurality of porous materials being fabricated in layers and so arranged that the work function progressively decreases from the first electrode to the second electrode.

7. The device described in claim 6 wherein each layer of material of said plurality of porous electron emitting materials is separated from the next layer by a thin metal layer.

8. The device described in claim 6 wherein each material of said plurality of porous materials is slightly diffused into the material having the next lowest work function.

References Cited

UNITED STATES PATENTS

| | | | |
|---|---|---|---|
| 3,037,065 | 7/1962 | Hockings et al. | 136—4 |
| 3,093,757 | 6/1963 | Lederer | 310—4 |
| 3,202,843 | 8/1965 | Hurst | 310—4 |

MILTON O. HIRSHFIELD, *Primary Examiner.*

J. W. GIBBS, D. F. DUGGAN, *Assistant Examiner.*